United States Patent [19]
Fuller

[11] Patent Number: 5,797,115
[45] Date of Patent: Aug. 18, 1998

[54] MEASURING DIRECT AND INDIRECT USAGE OF A CENTRAL PROCESSING UNIT

[76] Inventor: Billy Fuller, 8510 Sutterfield Dr., Colorado Springs, Colo. 80920

[21] Appl. No.: 518,668

[22] Filed: Aug. 24, 1995

[51] Int. Cl.[6] .................................................. G06F 19/00
[52] U.S. Cl. ............................................................ 702/186
[58] Field of Search ........................... 364/550, 551.01, 364/569; 395/184.01, 826, 835, 827, 837, 838, 180

[56] References Cited

U.S. PATENT DOCUMENTS

| | | | |
|---|---|---|---|
| 4,484,268 | 11/1984 | Crain | 364/200 |
| 4,638,427 | 1/1987 | Martin | 364/200 |
| 5,355,487 | 10/1994 | Keller et al. | 395/650 |
| 5,361,359 | 11/1994 | Tajalli et al. | 395/700 |
| 5,463,775 | 10/1995 | DeWitt et al. | 395/184.01 |
| 5,467,463 | 11/1995 | Siegel | 395/550 |
| 5,572,672 | 11/1996 | DeWitt et al. | 395/184.01 |
| 5,572,716 | 11/1996 | Meisner | 395/555 |
| 5,581,482 | 12/1996 | Wiedenman et al. | 395/184.01 |

FOREIGN PATENT DOCUMENTS

| | | |
|---|---|---|
| 0 320 329 A2 | 6/1989 | European Pat. Off. |
| 25 58 368 A | 7/1977 | Germany |
| 4-062644 A | 2/1992 | Japan |

OTHER PUBLICATIONS

Roger, L.S., "Microprocessor Utilization Indicator," IBM® Technical Disclosure Bulletin vol. 22, No. 1, Jun. 1979, pp. 272-275.

"Low–Overhead Processor Idle Detection in a Multitasking Operating System," IBM® Technical Disclosure Bulletin vol. 37, No. 10, Oct. 1, 1994, pp. 111–112.

*Primary Examiner*—James P. Trammell
*Attorney, Agent, or Firm*—William J. Kubida; Homer L. Knearl; Holland & Hart LLP

[57] ABSTRACT

Disclosed herein is a method and apparatus for measuring central processing unit (CPU) usage required to execute a predetermined workload that includes system overhead usage of the CPU as well as direct usage of the CPU. The CPU is driven to run processing cycles to perform a workload task or to perform a CPU bound task. The CPU bound task is a cycle soaker; a cycle soaker task runs directly on the CPU and has no system overhead. The cycle soaker task runs whenever there is no workload task ready to run. A monitor module measures the total of all cycles run by the central processing unit from beginning to end of execution of the workload and measures the soaker cycles run by the CPU from beginning to end of execution of the workload. CPU usage attributable to the workload is measured by deducting the soaker cycles from the total of all cycles.

19 Claims, 5 Drawing Sheets

MEASURING DIRECT AND INDIRECT USAGE OF A CENTRAL PROCESSING UNIT

BACKGROUND OF THE INVENTION

1. Field of the Invention

This invention relates to a method and apparatus for measuring direct and indirect usage of a central processing unit (CPU) attributable to a workload running on a data processing system containing the central processing unit. More particularly, this invention relates to measuring not only the direct usage of the CPU by the workload but also the system overhead usage of the CPU required to complete the workload. The indirect or system overhead usage refers to usage of the CPU by subsystems or devices in the data processing system when performing tasks that are part of the workload.

2. Description of Related Art

Measuring central processing unit (CPU) run time or cycles, as the data processing system runs a workload, is used for the purpose of managing a data processing system. Managing includes optimizing the hardware and software configuration the system, diagnosing the system, and charging users of the system for jobs run on the system. For main frame computing systems all operations for a job were tracked for CPU running time. Indirect usage or system overhead cycles of the CPU were tagged with a task identifier and the task was traced back to a job. Thus, the system could track all CPU cycles, direct or indirect, to the job or workload they were performing. This consumed some processing time for the system, but for a large system this CPU run time for system management purposes was acceptable.

With the advent of personal computing systems or personal computing workstations, users were less willing to allot processing time simply for the purpose of accurately tracking CPU running time per job or workload (multiple jobs). Particularly in the UNIX operating environment a practice evolved where only the direct usage of the CPU by a job was measured. Direct usage refers to tasks directly executed for the job by the CPU. System overhead, or indirect usage, of the CPU by subsystems working on the same job for the most part are not measured. Accordingly, half or more of the CPU cycles to perform a job may not be accumulated in measuring CPU time for the job if half or more of the tasks for the job are being performed by subsystems using the CPU indirectly for the job.

Some systems will measure direct CPU usage and estimate indirect CPU usage based on the amount of direct usage. Of course this is simply an estimate and is only as good as the criteria used for making the estimate. To date, there is no simple solution to the problem of measuring the entire CPU usage, all CPU cycles, consumed in running a given workload without tracking all the operations performed for the workload.

SUMMARY OF THE INVENTION

It is an object of this invention to measure the combined direct usage and indirect usage (system overhead) of a central processing unit (CPU) by a workload without tracking all the operations performed for the workload.

In accordance with this invention, the above object is accomplished by a computing system having a monitor module and a workload driver controlling a workload module and a CPU bound module. The monitor module measures direct CPU usage by the CPU bound module and measures the elapsed time to complete the workload. The workload module has workload tasks that are called directly by the workload to run on the CPU and other tasks, constituting system overhead for the workload, that are called from the computing system to run on the CPU. The CPU bound module only has tasks that run directly on the CPU; i.e. there is no system overhead with the CPU bound module.

The workload driver starts the CPU bound module and workload module. Tasks of the workload module have priority over tasks of the CPU bound module. If there is a task (direct or indirect) of the workload module to be run on the CPU, the workload task will run. However, if there are no workload tasks ready to run, a task from the CPU bound module will run. There will always be a task available from the CPU bound module. Thus, the CPU during a usage measurement for a given workload is always running and never idle. When the workload driver detects the workload module is complete, the workload driver stops the CPU bound module and the monitor module.

The monitor module after the workload is complete provides an elapsed time measurement from start to stop of the predetermined workload. Also the monitor module provides a measure of the CPU usage by the CPU bound module during the interval between start and stop of the predetermined workload. The workload driver receives the elapsed time and the CPU bound usage of the CPU and deducts the CPU bound usage from the elapsed time. The result is the total usage of the CPU by the workload including direct usage and system overhead.

The inventive process for measuring CPU usage by a predetermined workload begins with the step of running processing cycles in the central processing unit to perform a workload task or to perform a CPU bound task. The CPU bound task is a cycle soaker; a cycle soaker task or routine runs directly on the CPU consuming a CPU cycle or cycles and may or may not perform actual work. As its name indicates, the purpose of a cycle soaker task is to consume one or more CPU cycles.

The inventive process continues by measuring the total of all cycles run by the central processing unit from beginning to end of execution of the workload and by measuring the soaker cycles run by the CPU from beginning to end of execution of the workload. The inventive process detects CPU usage attributable to the workload by deducting the soaker cycles from the total of all cycles.

The invention is useful in providing a quick and efficient way to manage a computing system. Actual CPU run time, including system overhead, for a given job can be measured quickly and easily using the invention. Also the invention can measure the impact of adding new hardware or software to a computing system. For example, the invention is used to measure system performance change resulting from adding additional disk drives and/or a new software file system to the computing system.

The foregoing and other objects, features and advantages of the invention will be apparent from the following more particular description of a preferred embodiment of the invention as illustrated in the accompany drawings.

DETAILED DESCRIPTION

Figure 1:
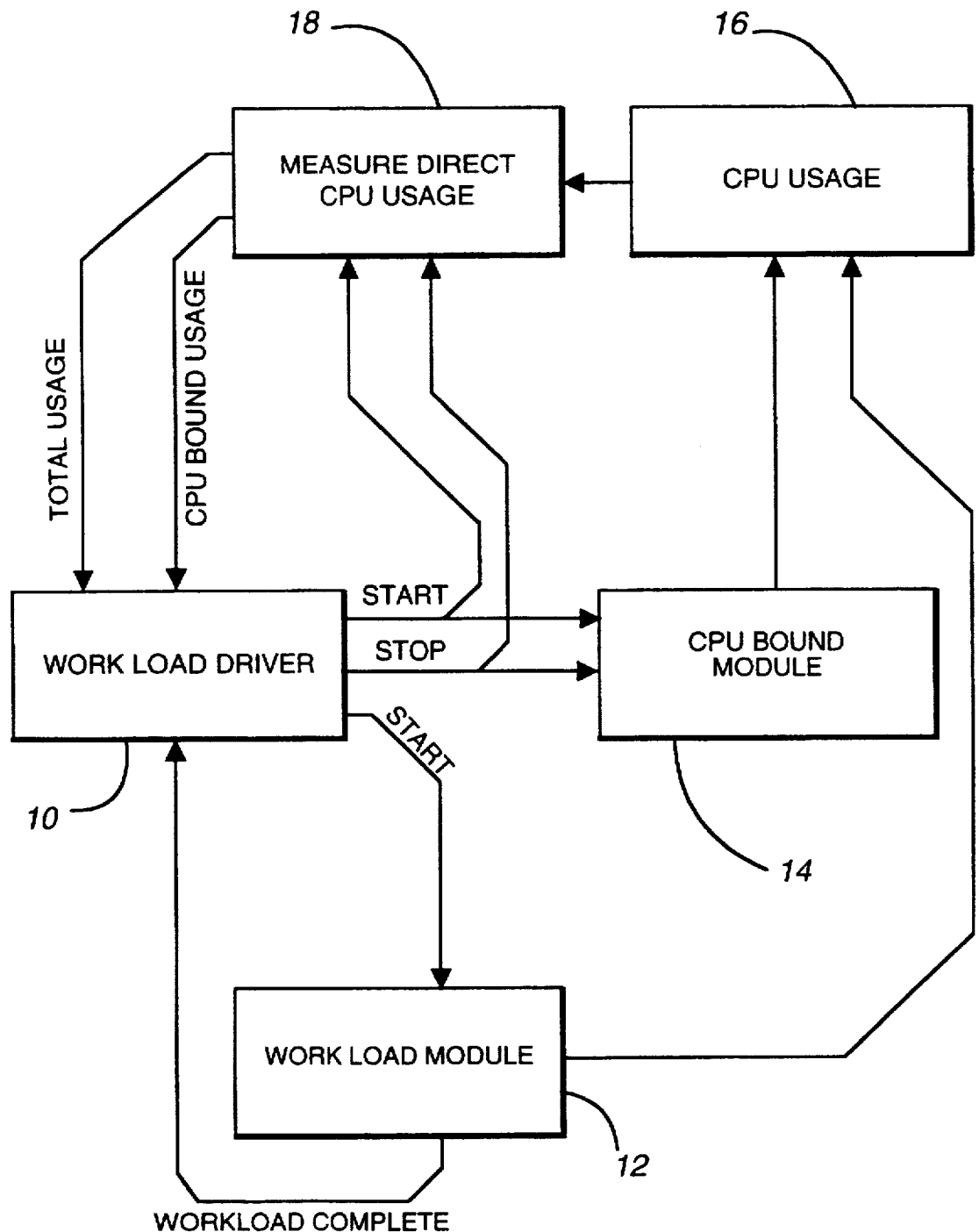
FIG. 1 shows the flow of control and information between the logical operations of the preferred embodiment of the invention.

FIG. 1 illustrates the interaction between the main operative elements of the preferred embodiment of the invention. These elements cooperate to measure the central processing unit usage required to support a predetermined workload. The workload driver 10 controls two process modules which together consume all of the CPU available cycles during the performance of the workload. One process module is workload process module 12 and the other process module is the CPU bound process module 14. The workload process 12 is the process whose central processing unit usage time is being measured. CPU usage by the workload process in module 12 consists of direct workload cycles and system overhead cycles.

In FIG. 1, the CPU usage 16 thus contains a portion for workload cycles and a portion for system overhead to the extent the central processing unit is performing system overhead associated with the workload tasks from workload process 12. As the workload is performed, there will be significant periods of idle time for the CPU. CPU bound process 14 operates to consume this CPU idle time. The workload process, including system overhead for the workload, has priority over the CPU bound process. When the CPU is not performing a workload cycle or an overhead cycle, then the CPU bound process 14 will cause the CPU to perform a cycle having no particular purpose other than to consume a CPU cycle. Such CPU bound processes are typically referred to as cycle soakers. In other words, the CPU bound process soaks up all unused cycles of the CPU so that there is no CPU idle time.

The monitor module 18 has the capability to measure the direct usage cycles of any process operating with the CPU. In FIG. 1, measuring the CPU direct usage cycles by the workload process would only give a partial measurement of CPU usage consumed by the workload since it would not contain the overhead usage of the CPU attributable to the workload process. On the other hand, measuring the direct usage of the CPU bound process 14 would give a complete measure of all CPU usage by that CPU bound process. This is because there is no overhead associated with the CPU bound process 14. Therefore, monitor module 18 will generate two outputs. The first output indicates the total elapsed time of the CPU from start to stop of the workload process, i.e. elapsed CPU run time (or total cycles) from start to stop of the workload. The second output indicates CPU bound usage of the CPU by the cycle soaker during the elapsed run time from start to stop of the workload process.

Workload driver 10 receives this information and subtracts the CPU bound usage from the total usage. The result is an accurate measure of direct and indirect CPU cycles to perform the workload. Thus, the workload driver can effectively detect all usage of the CPU by the workload process whether that usage is direct workload cycles or indirect system overhead cycles.

To recap the preferred operation of the invention, workload driver 10 starts the CPU bound process and the workload process and also the monitor module 18. As the workload process is executed by the CPU, all unused or idle cycles of the CPU are consumed by the CPU bound process 14. When the workload process 12 is completed, a stop or complete condition is detected by the workload driver 10 which then stops the CPU bound process and stops the monitor module 18. The monitor module 18 then provides a measure of the total elapsed time from start to stop of the workload process and a measure of the CPU bound process usage from start to stop of the workload process. The workload driver by deducting the CPU bound usage from the total elapsed time arrives at a usage measurement which includes both workload cycles for the workload process and system overhead cycles for the workload process.

Figure 2:
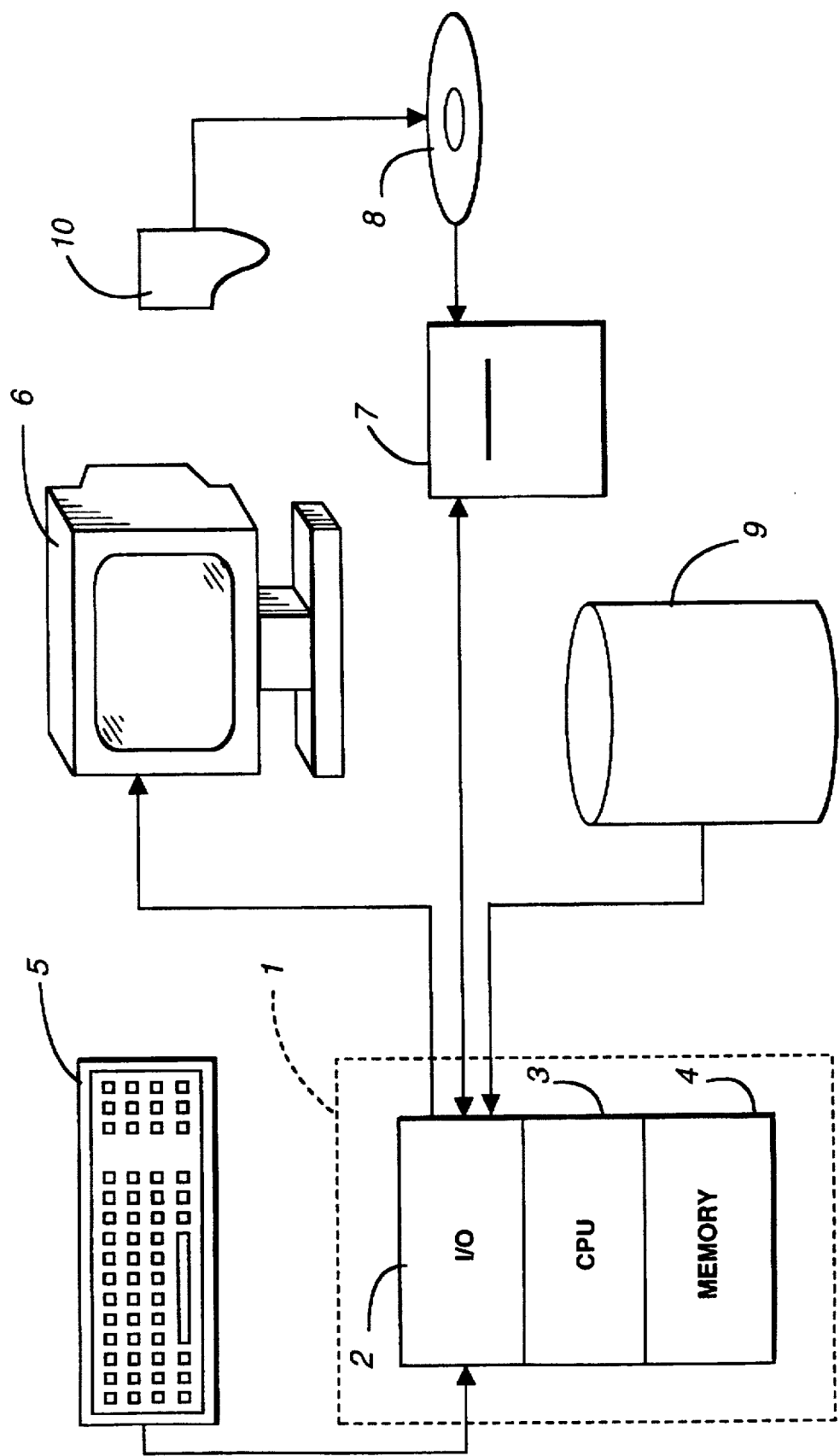
FIG. 2 shows a data processing system which provides the operative elements to perform the logical operations of the invention.

The operating environment in which the present invention is used encompasses the general distributed computing system, wherein general purpose computers, workstations, or personal computers are connected via communication links of various types, in a client-server arrangement, wherein programs and data, many in the form of objects, are made available by various members of the system. Some of the elements of a general purpose workstation computer are shown in FIG. 2, wherein a processor 1 is shown, having an input/output (I/O) section 2, a central processing unit (CPU) 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. The computer program products containing mechanisms to effectuate the apparatus and methods of the present invention may reside in the memory section 4, or on a disk storage unit 9, or on the CD-ROM 8 of such a system. Examples of such systems include SPARC systems offered by Sun MicroSystems, Inc., personal computers offered by IBM Corporation and by other manufacturers of IBM-compatible personal computers, and systems running the UNIX operating system.

Figure 3:
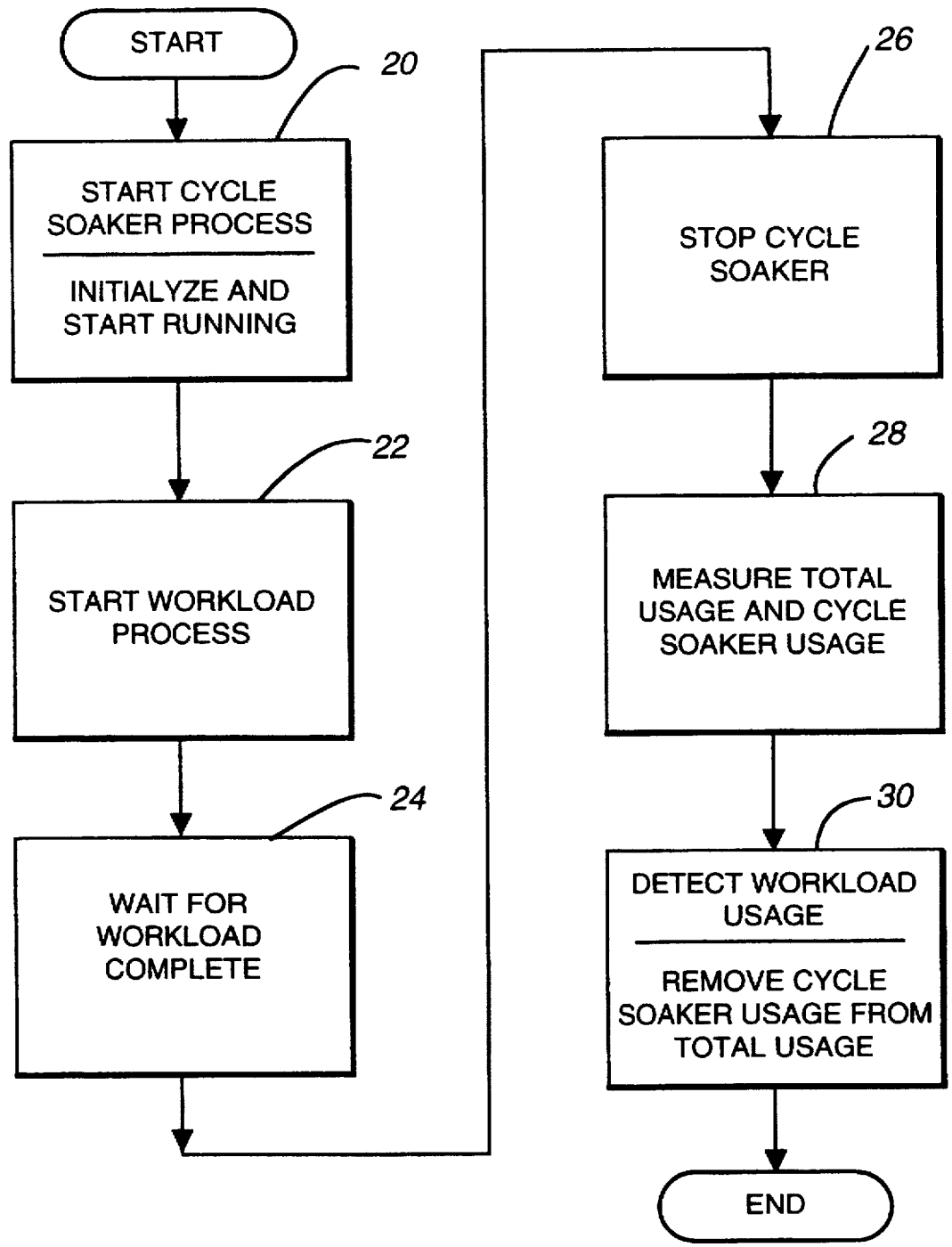
FIG. 3 is a flow diagram of the preferred embodiment of the invention illustrating the logical operations and steps performed in measuring workload usage of a central processing unit.

FIG. 3 illustrates a preferred embodiment for the logical operations or process steps of the invention accomplishing the operations illustrated in FIG. 1. The process begins at step 20 which starts the cycle soaker process 20. As soon as the cycle soaker process starts, step 22 starts the workload process. At this point in the process, the central processing unit (CPU) will be performing tasks for the workload process whenever those tasks are available either directly or indirectly. If none of the workload tasks are ready for processing, then the CPU will process a cycle soaker task. The wait operation 24 detects when the workload process is completed. When workload complete is detected by operation 24, operation 26 stops the cycle soaker.

With the workload complete, it is now possible to measure the CPU cycles used by, or the CPU time consumed in, performing the workload. Step 28 measures the total usage of the central processing unit and the cycle soaker usage of the central processing unit. Total usage is the elapsed time, or total CPU run cycles, from the start of operations at step 20 to the stopping of operations at step 26. The number of total cycles used by the CPU from start 20 to stop 26 will equal the number of cycles used directly and indirectly by the workload process and will also include the number of cycles used by the cycle soaker. Step 28 also measures the amount of CPU run time, or the number of cycles used by the CPU, in performing cycle soaker tasks when no workload tasks were ready.

In step 30, the CPU workload usage, including both direct usage and overhead usage, may be detected from the total usage and the cycle soaker usage. By deducting the cycle soaker usage from the total usage, the number of cycles or the amount of timed left is a measure of the workload usage, i.e., the amount of time used by the CPU to perform the workload cycles both direct workload cycles and system overhead cycles.

Figures 4, 5:
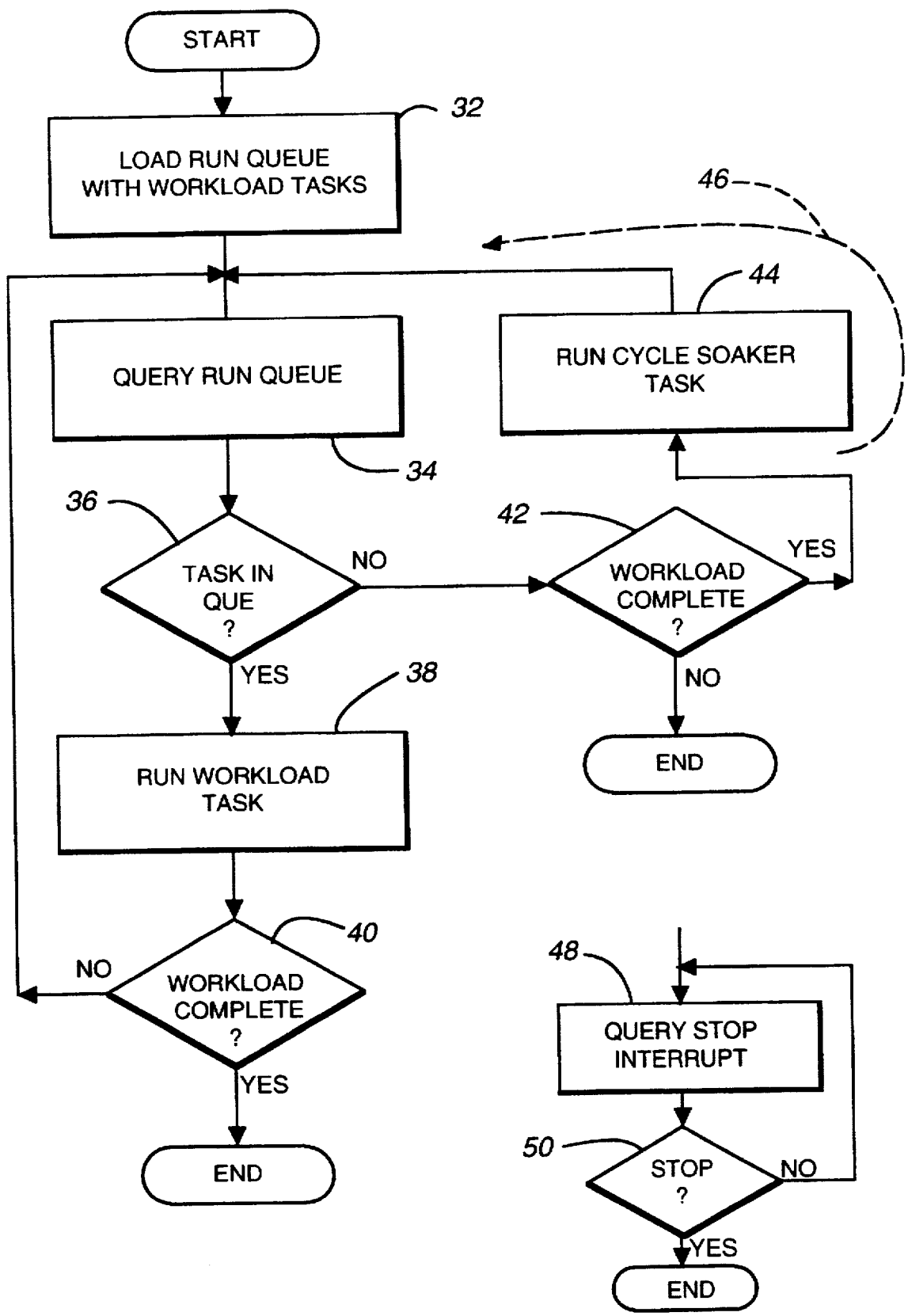
FIG. 4 shows the process flow for one preferred embodiment in implementing operations 22 through 26 in FIG. 3.
FIG. 5 is an example of a cycle soaker process.

FIG. 4 illustrates one preferred embodiment for implementing steps 20, 22, 24 and 26 of FIG. 3. In other words, the process in FIG. 4 manages the running of the workload task and the running of the cycle soaker task from start of the workload process to completion of the workload process. The process begins at operation 32 which loads workload tasks into a run queue. Operation 32 is an ongoing parallel process to the remaining process steps in FIG. 4. Thus, operation 32 begins loading workload tasks in the run queue and continues loading such tasks until there are no more workload tasks available for loading. Workload tasks may not be available because all workload tasks are completed or because remaining workload tasks are not ready for loading in the run queue. In the latter event, these tasks would be loaded by operation 32 into the run queue as soon as the workload tasks become available.

Operation 34 queries the run queue looking for a task to be run on the CPU. Decision operation 36 branches the process to step 38 if there is a task in the run queue. Operation 38 runs the workload task. When the task is completed, decision operation 40 tests whether the workload is complete. If the workload is complete, the process in FIG. 4 is finished, and the process flow moves onto operation 28 in FIG. 3 where total usage and cycle soaker usage are measured.

If the workload is not completed, the process returns to operation 34 to query the run queue for the next task in the queue. If decision operation 36 detects that there are no tasks in the run queue, the process branches to decision operation 42 to detect whether the workload is complete. If the workload is complete, then the process in FIG. 4 is finished, and again the process returns to step 28 in FIG. 3. If the workload is not complete, the process branches to operation 44 to run a cycle soaker task. The cycle soaker task runs one or more cycles of the CPU to process the cycle soaker task and then returns the process flow to operation 34 to query the run queue. In effect, the process remains in a loop 46 through operations 34, 36, 42, and 44 until the next workload task is in the run queue or until a workload complete condition is detected. In this way, all idle cycles of the CPU are consumed by the cycle soaker tasks until a next workload task is available to be run.

The cycle soaker may be implemented in many different ways. All that is required is that the CPU be kept busy by direct usage of the cycle soaker routine until the next workload task is ready to run on the CPU. In FIG. 5, a simple cycle soaker process is shown. The cycle soaker begins with the query operation 48 to query whether standard event such as a stop interrupt has been received by the CPU. Decision operation 50 tests whether the stop interrupt was received. If the interrupt was not received, the process loops back to operation 48 to query for a stop interrupt. If a stop interrupt is detected by decision operation 50, the cycle soaker process completes, and in FIG. 4, the process returns to query run queue 34.

The simple cycle soaker loop in FIG. 5 may be referred to as a task as well as a process. Of course, a cycle soaker process might consist of more than one task. Again, it is only required that the cycle soaker process be a direct usage process, i.e., no system overhead, of the central processing unit so that the measure operation 28 in FIG. 3 can measure all of the CPU time consumed by the cycle soaker.

Figure 6:
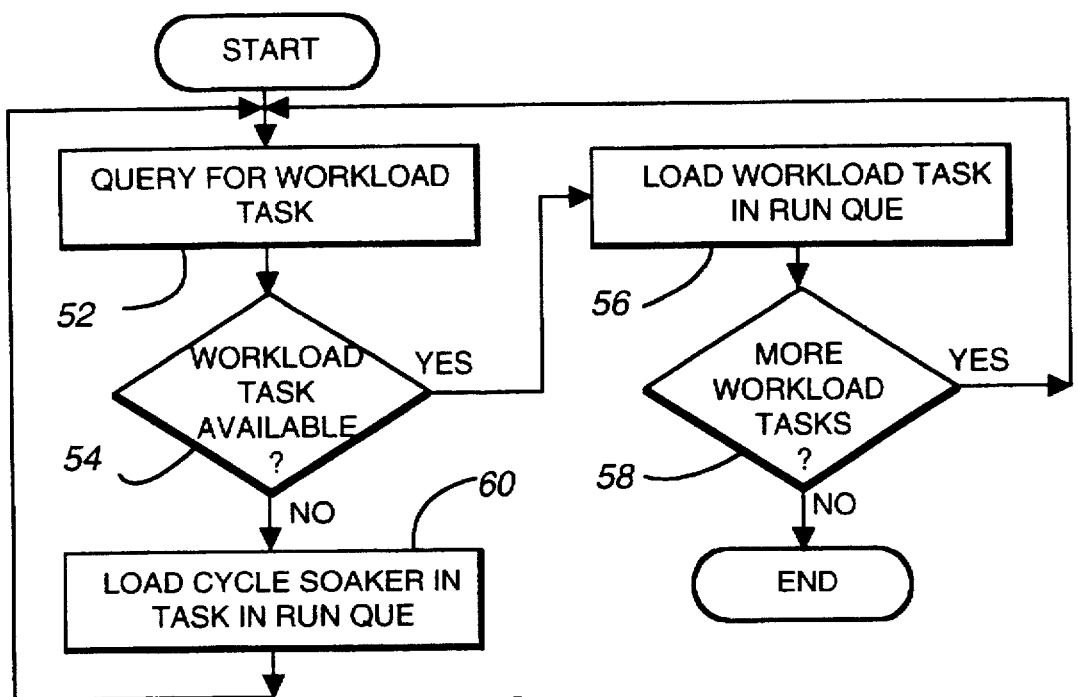
FIG. 6 shows another preferred embodiment for implementing the process for loading a run que with tasks from the workload and with cycle soaker tasks.

FIG. 6 illustrates another preferred embodiment of the invention where both workload tasks and cycle soaker tasks are loaded into the run queue. The process of loading the run queue in FIG. 6 begins with operation 52 which queries for a workload task. Decision operation 54 detects whether a workload task is available as a result of query operation 52. If the workload task is available, operation 56 loads the workload task into the run queue, and decision operation 58 tests for more workload tasks. If there are no more workload tasks, the load process in FIG. 6 is completed. If, however, there are more workload tasks whether or not they are currently available, the process in FIG. 6 is not completed and branches back to operation 52.

If decision operation 54 had detected that a workload task was not available then the process branches "no" to operation 60. Operation 60 loads a cycle soaker task into the run queue. After the cycle soaker task is loaded, the process returns to operation 52 to again query for a workload task. In effect, the process in FIG. 6 will load a run queue with cycle soaker tasks only if a workload task is not available. Finally, after all the workload tasks have been loaded, no more cycle soaker tasks are loaded into the run queue.

Figure 7:
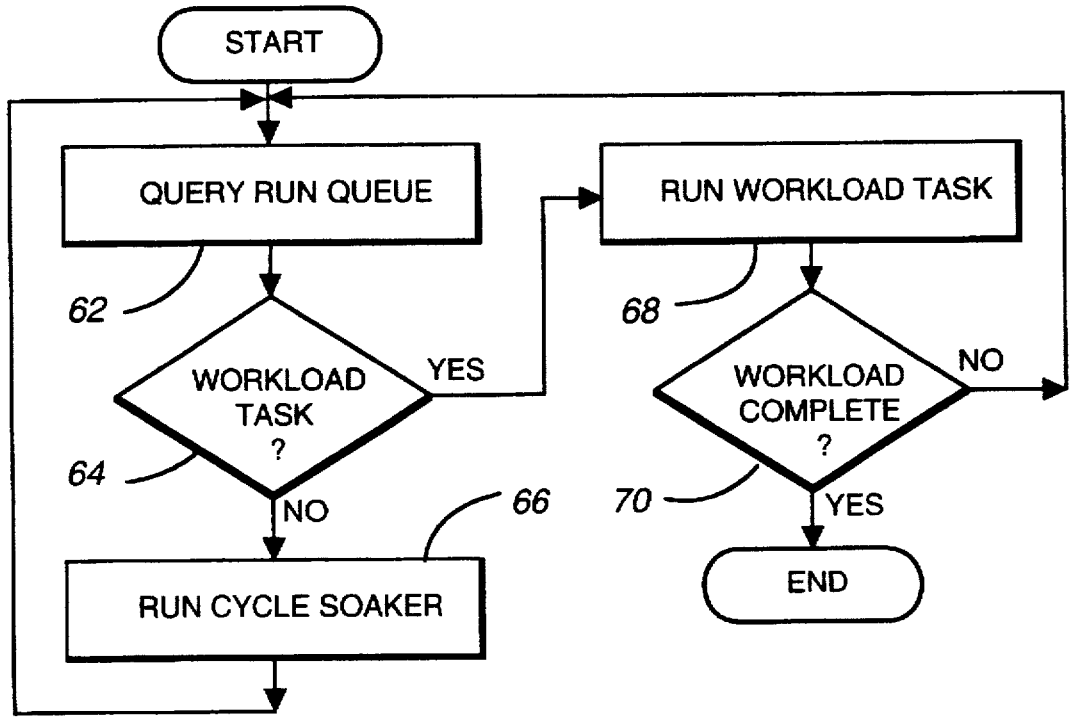
FIG. 7 shows a run CPU process flow that works with the load run que process of FIG. 6.

FIG. 7 illustrates a CPU run process for running tasks from a run queue loaded in accordance with the process in FIG. 6. In other words, the process in FIG. 7 will run either workload tasks or cycle soaker tasks on the CPU depending on the task retrieved from the run queue. The process begins at step 62 which queries the run queue for the task at the head of or the top of the run queue. Operation 62 reads the task at the top of the run queue, and decision operation 64 detects whether the task is a workload task or a cycle soaker task. If the task is a cycle soaker task, the process branches to operation 66 to retrieve the task from the run queue and run the cycle soaker task on the CPU. After the cycle soaker task operation is run, the process returns to the query operation 62 to read in the next task in the run queue. If the task in the run queue is a workload task, then decision operation 64 branches "yes" to operation 68. Operation 68 retrieves the workload and runs the workload task on the central processing unit. After the workload task has run, the process proceeds to decision step 70. Decision step 70 detects whether all tasks in the workload have been run. If the answer is "yes", then the workload is complete and the process in FIG. 7 returns to step 28 in FIG. 3 where the total usage and cycle soaker usage are measured. If the workload is not complete, then the process in FIG. 7 returns to operation 62 to query the run queue for the next task. When the workload is completed, the process returns to step 28 in FIG. 3.

While the invention has been particularly shown and described with reference to preferred embodiments thereof, it will be understood by those skilled in the art that various other changes in the form and details may be made therein without departing from the spirit and scope of the invention.

What is claimed is:

1. In a data processing system, a method for measuring workload usage of a central processing unit as the data processing system performs a predetermined workload having a plurality of workload tasks, said method comprising the steps of:

continuously running processing cycles in the central processing unit to perform a workload task, or to perform a cycle soaker task when the central processing unit is not processing cycles to perform workload tasks of the predetermined workload, so that the central processing unit is not idle during a workload usage measurement period that extends from a beginning to an end of performance of the predetermined workload;

measuring a total cycles number indicating all cycles run by the central processing unit during the workload usage measurement period;

measuring a soaker cycles number indicating all cycles run by the central processing unit during performance of a cycle soaker task and during the workload usage measurement period; and detecting a workload usage measurement by deducting the total soaker cycles number from the total cycles number.

2. The method of claim 1 and in addition:

loading a workload task at a next available location in a run queue, said run queue for queuing up tasks to be executed by the central processing unit;

loading a cycle soaker task at the next available location in the run queue when no workload task is ready for loading in the run queue; and said continuously running step running a workload task or a cycle soaker task depending on which of these tasks is at a first position in the run queue.

3. The method of claim 1 and in addition:

loading a workload task at a next available location in a run queue, said run queue for queuing up workload tasks to be executed by the central processing unit;

testing the run queue for a workload test to be executed and indicating if a workload task is present or not present in the run queue; and said continuously running step responsive to a workload task present in the run queue for running a workload task from the run queue;

said continuously running step responsive to a workload task not present in the run queue for running a cycle soaker task.

4. The method of claim 1 wherein the step of performing a cycle soaker task when the central processing unit is not performing workload tasks of the predetermined workload comprises the steps of:

querying for a standard event performed by the data processing system;

detecting the presence or absence of the standard event;

repeating the querying step when the detecting step detects the absence of the standard event; and ending the step of performing a cycle soaker task when the detecting step detects the absence of the standard event.

5. The method of claim 4 wherein said standard event is a stop interrupt.

6. In a computing system having a central processing unit, apparatus for measuring usage of the central processing unit (CPU) by a predetermined workload, said apparatus comprising:

a workload module for providing the predetermined workload, said workload having direct tasks and system overhead tasks, said direct tasks run on the CPU directly from the workload, said system overhead tasks run on the CPU to perform a computing system task;

a CPU bound module for providing CPU bound tasks that run on the CPU directly without any system overhead tasks;

a workload driver for issuing a start command to said workload module, said CPU bound module and a monitor module, said workload module running direct tasks and system overhead tasks on the CPU, said CPU bound module running CPU bound tasks on the CPU;

said workload module indicating workload complete when said predetermined workload has been completed;

said workload driver responsive to workload complete for issuing a stop command to said workload module and said monitor module;

said monitor module for measuring the direct CPU usage by the CPU bound module and the total usage of the CPU between the start command and the stop command from the workload driver; and said workload driver responsive to the total usage and the direct CPU usage by the CPU bound module for measuring the CPU usage by the predetermined workload.

7. The apparatus of claim 6 wherein said workload driver subtracts the CPU usage by the CPU bound module from the total usage of the CPU to measure the CPU usage by the predetermined workload.

8. The apparatus of claim 6 wherein said workload module has a higher priority than said CPU bound module in running their respective tasks on the CPU so that CPU bound tasks only run on the CPU when there are no available direct tasks or system overhead tasks from the workload module.

9. The apparatus of claim 8 wherein said workload driver subtracts the CPU usage by the CPU bound module from the total usage of the CPU to measure the CPU usage by the predetermined workload.

10. In a data processing apparatus for measuring workload usage of a central processing unit as the data processing apparatus executes a predetermined workload having a plurality of workload routines, the apparatus comprising:

means for continuously running processing cycles in the central processing unit to perform a workload routine, or to perform a cycle soaker routine when a workload routine is not available to run on the central processing unit;

means for measuring an elapsed time that extends from a beginning to an end of execution of the predetermined workload on the central processing unit;

means for measuring a cycle soaker run time that is consumed by the cycle soaker routine during the elapsed time; and means for measuring central processor unit usage by the predetermined workload by deducting the cycle soaker run time from the elapsed time.

11. The apparatus of claim 10 wherein said means for continuously running means comprises:

means for loading a workload routine at a next available location in a run queue, said run queue for queuing up routines to be executed by the central processing unit;

means for loading a cycle soaker routine at the next available location in the run queue when no workload routine is ready for loading in the run queue; and means for retrieving a workload routine or a cycle soaker routine depending on which of these routines is at head of the run queue.

12. The apparatus of claim 10 including:

means for loading a workload routine at a next available location in a run queue, said run queue for queuing up workload routines to be executed by the central processing unit;

means for querying the run queue for a workload routine to be executed and detecting if a workload routine is present or not present in the run queue;

means responsive to a workload routine present in the run queue for running a workload routine from the run queue; and means responsive to a workload routine not present in the run queue for running a cycle soaker routine.

13. A computer program storage medium readable by a computing system and encoding a program of instructions for executing a computer process for measuring workload usage of a central processing unit when the computing system performs a predetermined workload having a plurality of workload tasks, the computer process comprising the steps of:

continuously running process cycles in the central processing unit to perform a workload task, or to perform a cycle soaker task when the central processing unit is not processing cycles to perform a workload task, so that the central processing unit is not idle as the computing system performs the predetermined workload during a test time period that extends from a beginning to an end of performing the predetermined workload;

measuring a total cycles number indicating all cycles run by the central processing unit the test time period;

measuring a total soaker cycles number indicating all cycles run by the central processing unit during the test time period in performing a cycle soaker task; and detecting a workload usage measurement by deducting the total soaker cycles number from the total cycles number.

14. The computer process of claim 13 further comprising the steps of:

loading a workload task at a next available location in a run queue, said run queue for queuing up tasks to be executed by the central processing unit;

loading a cycle soaker task at the next available location in the run queue when no workload task is ready for loading in the run queue; and running a workload task or a cycle soaker task depending on which of these tasks is at a first position in the run queue.

15. The computer process of claim 14 wherein the step of running a cycle soaker task includes the steps of:

querying for a standard event performed by the computing system;

detecting the presence or absence of the standard event;

repeating the querying step when the detecting step detects the absence of the standard event; and ending the step of running of a cycle soaker task when the querying step detects the presence of the standard event.

16. The computer process of claim 13 further comprising the steps of:

loading a workload task at a next available location in a run queue, said run queue for queuing up workload tasks to be executed by the central processing unit;

testing the run queue for a workload test to be executed and indicating if a workload task is present or not present in the run queue;

said running step responsive to a workload task present in the run queue for running a workload task from the run queue; and said running step responsive to a workload task not present in the run queue for running a cycle soaker task.

17. The computer process of claim 16 wherein the step of running a cycle soaker task includes the steps of:

querying for a standard event performed by the central processing unit;

detecting the presence or absence of the standard event;

repeating the querying step when the detecting step detects the absence of the standard event; and ending the step of running a cycle soaker task when the querying step detects the presence of the standard event.

18. The computer process of claim 13 wherein the step of running a cycle soaker task comprises the steps of:

querying for a standard event performed by the computing system;

detecting the presence or absence of the standard event;

repeating the querying step when the detecting step detects the absence of the standard event; and ending the step of running a cycle soaker task when the detecting step detects the presence of the standard event.

19. The process of claim 18 wherein said standard event is a stop interrupt.

* * * * *